United States Patent
Park

(10) Patent No.: US 10,962,288 B2
(45) Date of Patent: Mar. 30, 2021

(54) INTEGRATED REFRACTORY MANAGEMENT SYSTEM AND CONTROL METHOD THEREFOR

(71) Applicants: Seung Jae Park, Suncheon-si (KR); EXCELLO CO., LTD., Gwangyang-si (KR)

(72) Inventor: Seung Jae Park, Suncheon-si (KR)

(73) Assignees: Seung Jae Park, Suncheon-si (KR); EXCELLO CO., LTD., Gwangyang-si (KR)

( * ) Notice: Subject to any disclaimer, the term of this patent is extended or adjusted under 35 U.S.C. 154(b) by 277 days.

(21) Appl. No.: 16/081,924

(22) PCT Filed: May 2, 2016

(86) PCT No.: PCT/KR2016/004622
§ 371 (c)(1),
(2) Date: Sep. 3, 2018

(87) PCT Pub. No.: WO2017/179755
PCT Pub. Date: Oct. 19, 2017

(65) Prior Publication Data
US 2019/0120555 A1      Apr. 25, 2019

(30) Foreign Application Priority Data

Apr. 14, 2016 (KR) ........................ 10-2016-0045413

(51) Int. Cl.
*F27D 21/00* (2006.01)
*F27B 1/28* (2006.01)
(Continued)

(52) U.S. Cl.
CPC ............ *F27D 21/0021* (2013.01); *F27B 1/28* (2013.01); *F27D 19/00* (2013.01); *F27D 21/02* (2013.01);
(Continued)

(58) Field of Classification Search
CPC ...... F27D 21/0021; F27D 19/00; F27D 21/02; F27D 1/16; F27D 21/04;
(Continued)

(56) References Cited

U.S. PATENT DOCUMENTS 3,532,797 A    10/1970  Lunig
3,954,507 A *   5/1976  Carter ...................... G01K 7/04
                                                    136/233
(Continued)

FOREIGN PATENT DOCUMENTS

CN      1216115 A      5/1995
FR      2033308 A1    12/1970
(Continued)

OTHER PUBLICATIONS

International Search Report for PCT/KR2016/004622 dated Jan. 12, 2017 from Korean Intellectual Property Office.

*Primary Examiner* — Nathaniel T Woodward
*Assistant Examiner* — Philip L Cotey
(74) *Attorney, Agent, or Firm* — Revolution IP, PLLC

(57) ABSTRACT

An integrated refractory management system includes: a cable module, at least a portion of which is inserted into a refractory; a measurement module, disposed outside the refractory, for measuring a current signal flowing through the cable module; an integrated management module for determining the state of the refractory on the basis of the current signal measured by the measurement module, displaying the state of the refractory, and generating management information on the refractory; and a local terminal for receiving the management information from the integrated management module.

6 Claims, 6 Drawing Sheets

(51) Int. Cl.
*F27D 21/02* (2006.01)
*F27D 19/00* (2006.01)
*G01N 25/04* (2006.01)
*F27D 1/16* (2006.01)
*F27D 21/04* (2006.01)

(52) U.S. Cl.
CPC .............. *G01N 25/04* (2013.01); *F27D 1/16* (2013.01); *F27D 21/04* (2013.01); *F27D 2001/1605* (2013.01); *F27D 2021/005* (2013.01); *F27D 2021/0057* (2013.01)

(58) Field of Classification Search
CPC ....... F27D 2001/1605; F27D 2021/005; F27D 2021/0057; F27B 1/28; G01N 25/04
See application file for complete search history.

(56) References Cited

U.S. PATENT DOCUMENTS

| | | | |
|---|---|---|---|
| 4,248,809 A | | 2/1981 | Sakai et al. |
| 4,274,284 A | * | 6/1981 | Hance .................. G01K 13/125 374/139 |
| 4,832,742 A | * | 5/1989 | Ototani .............. B23K 35/0266 75/304 |
| 5,158,366 A | | 10/1992 | Nagai et al. |
| 5,939,136 A | | 8/1999 | Cronk et al. |
| 6,309,442 B1 | * | 10/2001 | Usher .................... B22D 2/003 266/44 |
| 10,333,047 B2 | * | 6/2019 | Gilbert .................. H01L 39/126 |
| 2014/0113828 A1 | * | 4/2014 | Gilbert .................. H01L 39/225 505/100 |
| 2015/0316422 A1 | * | 11/2015 | Oya ........................ G01K 13/02 374/185 |

FOREIGN PATENT DOCUMENTS

| | | |
|---|---|---|
| JP | 58-19685 A | 2/1983 |
| KR | 10-0142240 B1 | 7/1998 |
| KR | 10-2000-0005435 A | 1/2000 |
| KR | 10-2013-0010392 A | 1/2013 |
| KR | 10-2013-0035084 A | 4/2013 |

* cited by examiner

INTEGRATED REFRACTORY MANAGEMENT SYSTEM AND CONTROL METHOD THEREFOR

TECHNICAL FIELD

The present invention relates to an integrated refractory management system and a method of controlling the same, and more particularly, to an integrated refractory management system for efficiently managing refractory by instantly determining a condition of the refractory, and a method of controlling the same.

BACKGROUND ART

Generally, refractories such as refractory bricks and castables may be mounted inside various industrial furnaces, such as heating furnaces, heat treatment furnaces, calcining furnaces, and blast furnaces, which are used for iron manufacturing processes and the like.

Refractory can be exposed to a high temperature environment for a long period of time along with processes in an industrial furnace and can be damaged by thermal impact during the processes.

However, since refractory is disposed inside an industrial furnace, there are a lot of limitations in instantly determining whether the refractory is damaged.

In addition, it is difficult to determine a damaged location of refractory and a degree of damage due to thermal impact.

Thus, when a point in time for appropriate repair and replacement of refractory passes, since damaged refractory affects processes in an industrial furnace, the damaged refractory generates defects in manufactured products and thus has adverse effects on the quality thereof.

In addition, damage to refractory causes detachment of the refractory mounted inside an industrial furnace.

Further, detachment of refractory causes heat loss, damage to external facilities, safety accidents of operators, and the like, due to molten iron flowing out through a region from which the refractory is detached.

DISCLOSURE

Technical Problem

It is one object of the present invention to provide an integrated refractory management system capable of efficiently managing refractory by instantly determining a condition of the refractory, and a method of controlling the integrated refractory management system.

Technical Solution

In accordance with one aspect of the present invention, an integrated refractory management system includes: a cable module at least partially inserted into a refractory; a measurement module disposed outside the refractory and measuring a current signal flowing through the cable module; an integrated management module determining a condition of the refractory based on the current signal measured by the measurement module, displaying the condition of the refractory, and generating management information on the refractory; and a local terminal receiving the management information from the integrated management module, wherein the cable module includes one or more cables disposed inside the refractory, and each of the cables includes: a metal wire having both ends coupled to the measurement module; and a space securing coating layer coated onto at least a portion of an outer surface of the metal wire and securing an expansion space for the metal wire by being melted upon increase in temperature of the refractory.

In accordance with another aspect of the present invention, a method of controlling the integrated refractory management system includes: measuring, by the measurement module, a current signal flowing through the cable module; determining, by the integrated management module, a condition of a refractory according to the current signal measured by the measurement module; displaying, by the integrated management module, the condition of the refractory on the data output unit; and transmitting, by the integrated management module, management information on the refractory to the local terminal.

Advantageous Effects

According to the present invention, the integrated refractory management system and the method of controlling the integrated refractory management system have the following effects.

First, since the cable module is mounted inside the refractory, the refractory can be efficiently managed by instantly determining the condition of the refractory, when the refractory suffers damage such as cracking and breakage due to heat and impact.

Second, cable modules are disposed independently of each other according to depth in the refractory, whereby a location and information on damage to the refractory can be easily determined.

Third, the cable module inserted into the refractory has a screw shape including protrusions or a twisted shape including a plurality of individual wires twisted together, whereby the cable module can be firmly coupled to the refractory.

Fourth, the coating layer is formed on the outer surface of the metal wire and melts upon increase in the temperature of the refractory, thereby providing a space allowing expansion of the metal wire of the cable module upon increase in the temperature of the refractory.

BEST MODE

Figure 1:
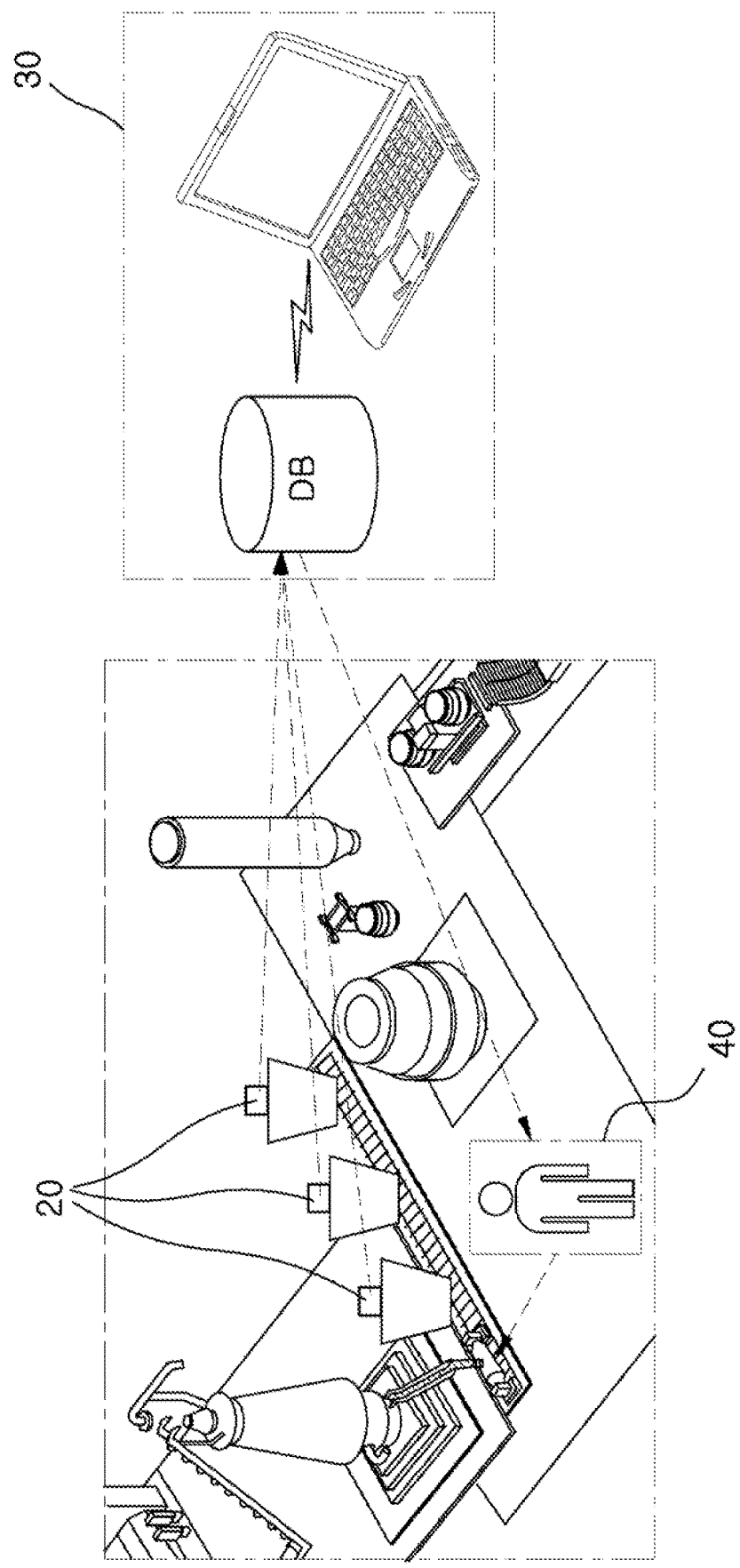
FIG. 1 is schematic diagram of an integrated refractory management system according to the present invention.
Figure 2:
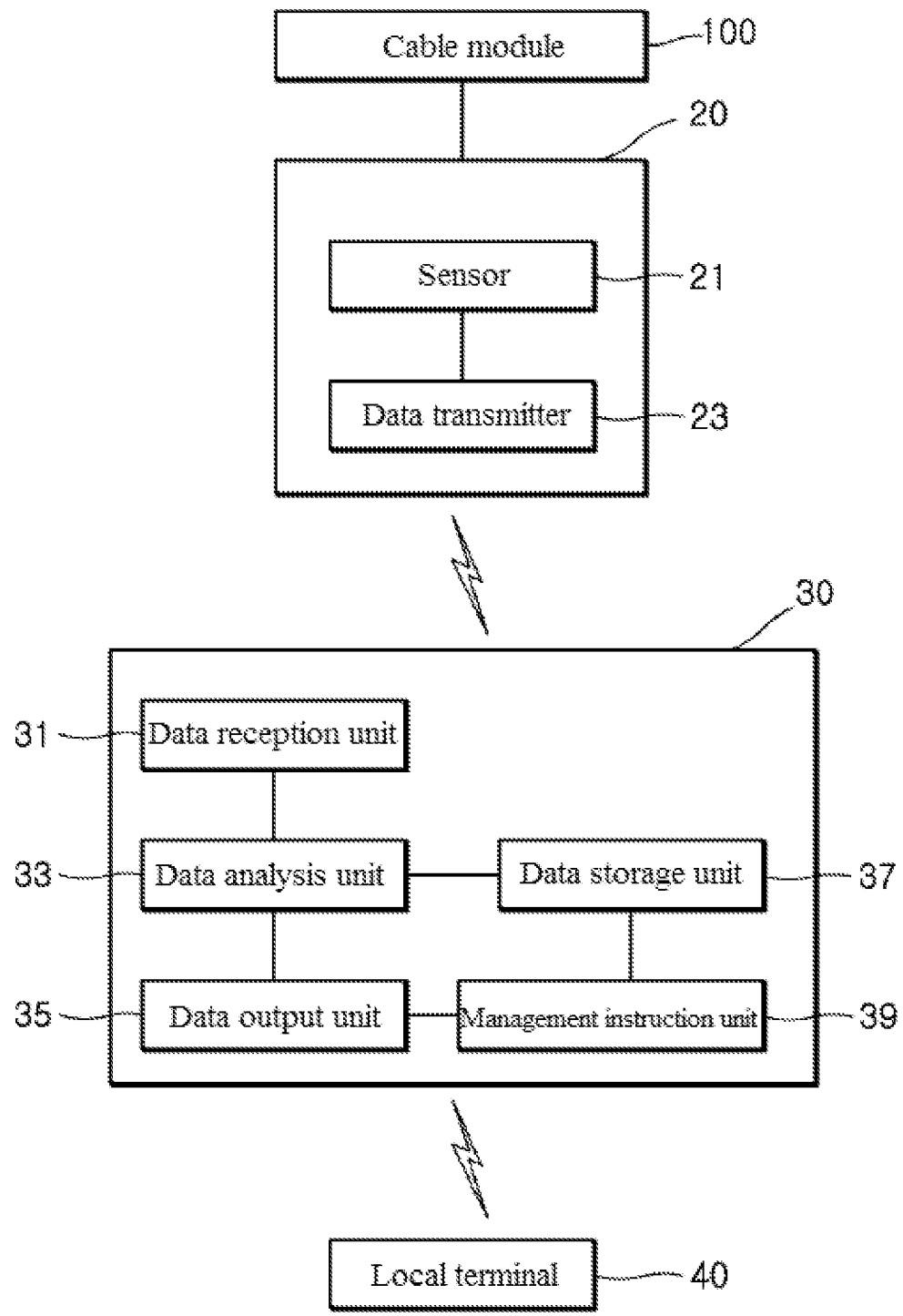
FIG. 2 is a block diagram of an integrated refractory management system.
Figure 3:
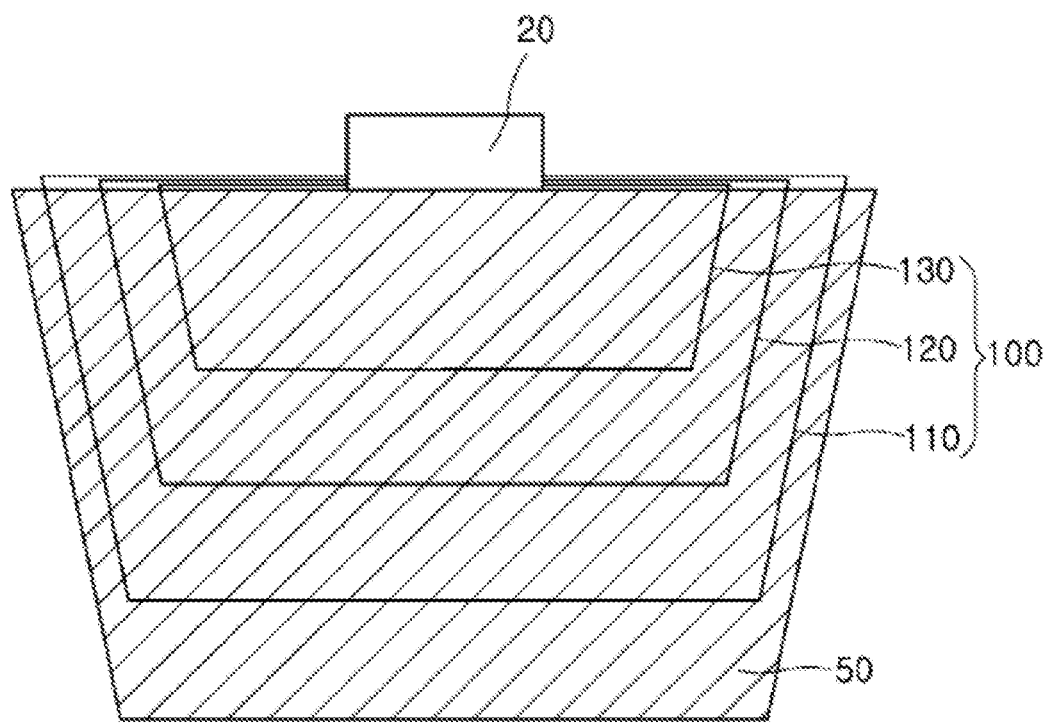
FIG. 3 is a sectional view illustrating coupling relationships between refractory, a cable module, and a measurement module in an integrated refractory management system.
Figure 4:
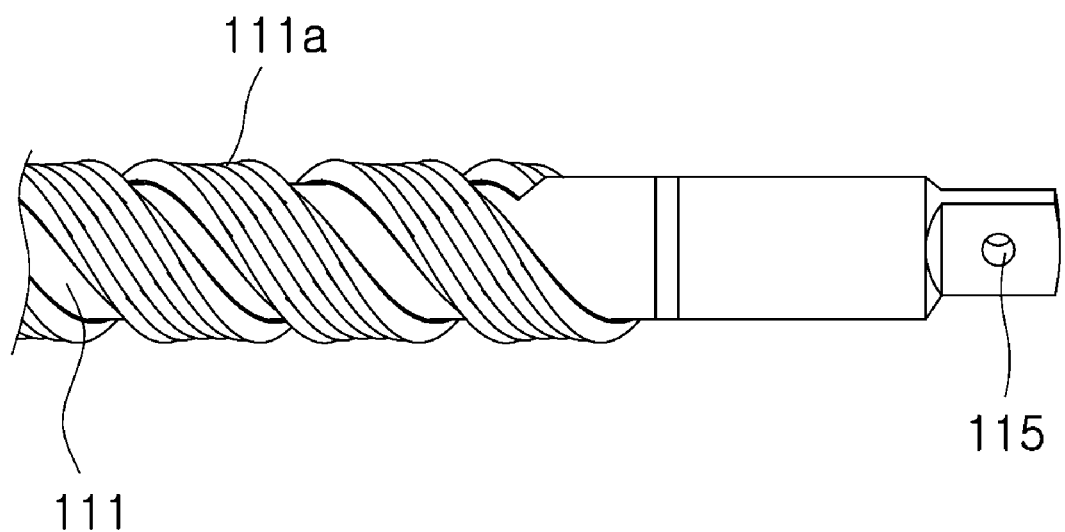
FIG. 4 is a side view of a first embodiment of a cable module according to the present invention.
Figure 5:
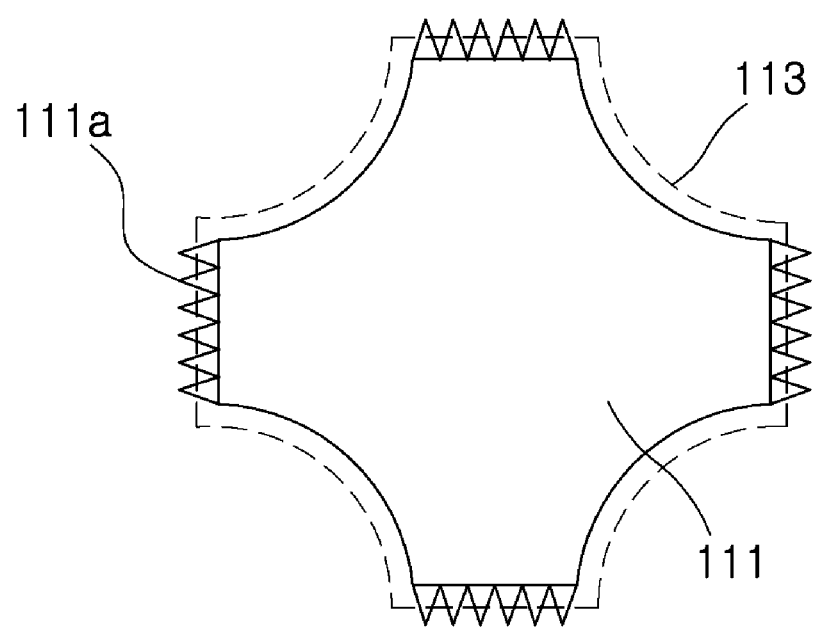
FIG. 5 is a cross-sectional view of the cable module of FIG. 4.

Hereinafter, embodiments of the present invention will be described in detail with reference to the accompanying drawings. Like components will be denoted by like reference numerals throughout the specification and repeated description thereof will be omitted.

An integrated refractory management system according to the present invention will be described below with reference to FIGS. 1 to 5.

As shown in FIGS. 1 to 5, the integrated refractory management system according to this embodiment includes refractory 50, cable modules 100, a measurement module 20, an integrated management module 30, and a local terminal 40.

In manufacturing the refractory 50 including the cable modules 100 mounted therein, the cable modules 100 are independently disposed at different locations and heights depending upon shapes and sizes of refractories 50.

After the refractory 50 is dried, the cable module 100 is connected to the measurement module 20 mounted outside the refractory 50.

Next, the refractory 50 including the measurement module 20 is provided to facilities such as industrial furnaces and the like.

Current flows through the cable module 100 and a current signal measured by the measurement module 20 varies with a condition of the refractory 50 due to detachment, melting, cracking, breakage, erosion and the like of the refractory 50.

In addition, the cable module 100 includes one or more cables at least partially inserted into the refractory 50.

Specifically, the cable module 100 includes a first cable 110, a second cable 120, and a third cable 130, which are disposed independently of each other according to depth in the refractory 50.

Both ends of each of the first cable 110, the second cable 120, and the third cable 130 are exposed outside the refractory 50 and connected to the measurement module 20 disposed outside the refractory 50.

In addition, each of the first cable 110, the second cable 120, and the third cable 130 is independently connected to the measurement module 20 and forms a closed loop.

Thus, the measurement module 20 may measure a current signal of each of the first cable 110, the second cable 120, and the third cable 130.

Therefore, a field operator can easily determine a damage location and a damage state of the refractory 50 by way of the current signal.

As a result, since a field operator and a person in charge can instantly and more accurately determine the damage location and the damage state of the refractory 50, the refractory 50 can be quickly repaired and replaced, thereby minimizing accident risk.

Since the first cable 110, the second cable 120, and the third cable 130 have substantially the same structure, the following description will focus on the first cable 110.

The first cable 110 includes a metal wire and a space securing coating layer 113.

The metal wire includes a wire main body 111 having a screw shape, a protrusion 111a protruding from at least a portion of an outer surface of the wire main body 111, and a module connecting terminal 115 formed at both ends of the metal wire and connected to the measurement module 20.

In the metal wire, since the wire main body 111 has a screw shape to provide an uneven surface, the wire main body 111 has a larger surface area per unit length than a general metal wire having a circular cross-section.

In addition, since the protrusion protrudes from a surface of the wire main body 111, a surface area over which the metal wire contacts the refractory is increased.

As a result, the wire main body 111 having a screw shape and the protrusion having a saw tooth shape can hold the refractory, whereby a coupling structure between the refractory 50 and the cable module 100 may be reinforced.

In addition, the outer surface of the wire main body 111 may be partially irregularly recessed in order to increase the surface area over which the metal wire contacts the refractory 50.

The present invention is not limited to the embodiment set forth above, and the metal wire may include the wire main body 111 and a refractory bonding member irregularly bonded to at least a portion of the outer surface of the wire main body 111.

The refractory bonding member may include metallic fibers such as hot fibers and the like, is attached onto the outer surface of the wire main body 111 to be introduced into the refractory 50, and is bonded well to materials constituting the refractory 50.

Thus, since a coupling structure between the refractory 50 and the metal wire is reinforced, detachment of the refractory can be suppressed.

The metal wire may include an SUS material having excellent thermal resistance so as not to be easily melted or expanded due to heat transferred from the refractory 50.

The material for the metal wire is not limited thereto and the metal wire may include a metal having excellent heat resistance and good current-carrying properties.

In addition, the metal wire may have a structure in which a copper wire is placed at the center to secure good current-carrying properties and an SUS line surrounds an outer surface of the copper wire such that the copper wire is not easily melted due to heat from the refractory 50.

The space securing coating layer 113 is coated onto at least a portion of the outer surface of the metal wire and secures an expansion space for the metal wire by being melted upon increase in temperature of the refractory 50.

When the metal wire expands due to increase in temperature of the refractory 50, the metal wire at least partially fills the expansion space formed by the space securing coating layer 113.

Thus, the space securing coating layer 113 is melted due to heat transferred from the refractory 50 and thus discharged from the refractory 50 in the form of a coating liquid.

The present invention is not limited to the embodiment set forth above, and a storage tank capable of accommodating and storing the discharged coating liquid may be disposed outside the refractory 50.

The storage tank may serve to guide the coating liquid to be inserted back into the refractory 50 while accommodating and storing the coating liquid.

The space securing coating layer 113 may include paraffin.

The material for the space securing coating layer 113 is not limited thereto and the space securing coating layer 113 may include a material that has a lower melting point than the metal wire set forth above, allows a simple coating process, and does not have current-carrying properties.

The measurement module 20 is disposed outside the refractory 50 and measures a current signal flowing through the cable module 100.

Specifically, the measurement module 20 includes a sensor 21 and a data transmitter 23.

The sensor 21 measures a current signal flowing through the cable module 100.

The data transmitter 23 transmits the current signal measured by the sensor 21 to the integrated management module 30.

The present invention is not limited to the embodiment set forth above and the measurement module 20 may further include an alarm unit.

The alarm unit displays alarm information such that a field manager can check the condition of the refractory 50 when the condition of the refractory 50 is outside a normal condition.

The alarm information and a control signal of the alarm unit may be transmitted from the integrated management module.

The alarm unit is disposed near the refractory 50 and displays the condition of the refractory 50 with an alarm sound and an indicator lamp.

Alarm sound and a color of the indicator lamp vary depending upon a damage state of the refractory 50, such that a field operator checks the damage state of the refractory 50 in real time and quickly performs repair and replacement of the refractory 50.

The integrated management module 30 determines the condition of the refractory 50 based on the current signal measured by the measurement module 20, displays the condition of the refractory 50, and generates management information on the refractory 50.

Specifically, the integrated management module 30 includes a data reception unit 31, a data analysis unit 33, a data storage 37, a data output unit 35, and a management instruction unit 39.

The data reception unit 31 receives a current signal sent from the data transmitter 23 and transmits the current signal to the data analysis unit 33.

The data analysis unit 33 determines the condition of the refractory 50 by calculating the current signal sent from the data reception unit 31, and information related to the condition of the refractory is stored in the data storage 37.

Specifically, the data analysis unit 33 analyzes the current signal measured by the measurement module 20, based on data conversion criteria stored in the data storage 37. In the data conversion criteria, the condition of the refractory 50 is defined according to the corresponding current signal.

As a result, the damage state and location of the refractory 50 are determined according to an analysis result of the current signal by the data analysis unit 33.

Analysis of the current signal includes disconnection due to cracking and breakage of the refractory 50, noise generated by molten iron penetrating into a cracked space of the refractory 50, the current signal changed by heat from the refractory 50, and the like.

A degree and location of cracking of the refractory 50 may be determined based on change of the current signal due to heat of the refractory 50, whereby the refractory 50 can be analyzed as to a start point of cracking, a progress speed thereof, and a degree thereof.

In addition, the data analysis unit 33 may determine the management information of the refractory 50 based on the number and history of refractories 50 stored in the data storage 37.

Specifically, the data analysis unit 33 may determine, in real time, available stock of damaged refractory among the refractories 50 disposed in respective sections of an industrial furnace, and a history of the refractory 50 including a model, a manufacturer, manufacturing and receiving dates, Lot Number, and the like of the refractory 50.

The condition of the refractory 50 stored in the data storage 37 may be used to determine a cycle and a time point of replacement of the refractory 50.

Specifically, a defect rate, a breakage rate, a use rate, and the like of the refractory 50 may be determined through analysis based on information on the condition of the refractory stored in the data storage 37, and may be used by the integrated management module 30 to manage damage and breakage histories of the refractory.

The data output unit 35 displays the condition of the refractory 50, the available stock and history of the refractory 50, and the damage and breakage histories of the refractory 50.

The management instruction unit 39 transmits the management information on the refractory 50 to the local terminal 40 and thus allows the field manager and the person in charge to check the condition of the refractory 50 in real time.

Therefore, a field manager and a person in charge can instantly repair and replace the refractory 50.

The local terminal 40 receives the management information of the refractory 50 from the integrated management module 30.

The local terminal 40 may include notebooks and mobile phones of the field manager and the person in charge.

A management command sent to the local terminal 40 varies corresponding to the condition of the refractory 50, and thus, a field manager and a person in charge can perform management corresponding to the condition of the refractory 50.

The integrated refractory management system including the cable module 100, the measurement module 20, the integrated management module 30, and the local terminal 40 enables integrated management of the refractory 50 and real-time monitoring of the condition of the refractory 50, thereby minimizing the number of field managers required to manage the refractory 50.

A method of controlling an integrated refractory management system according to the present invention will be described below with reference to FIG. 6.

Figure 6:
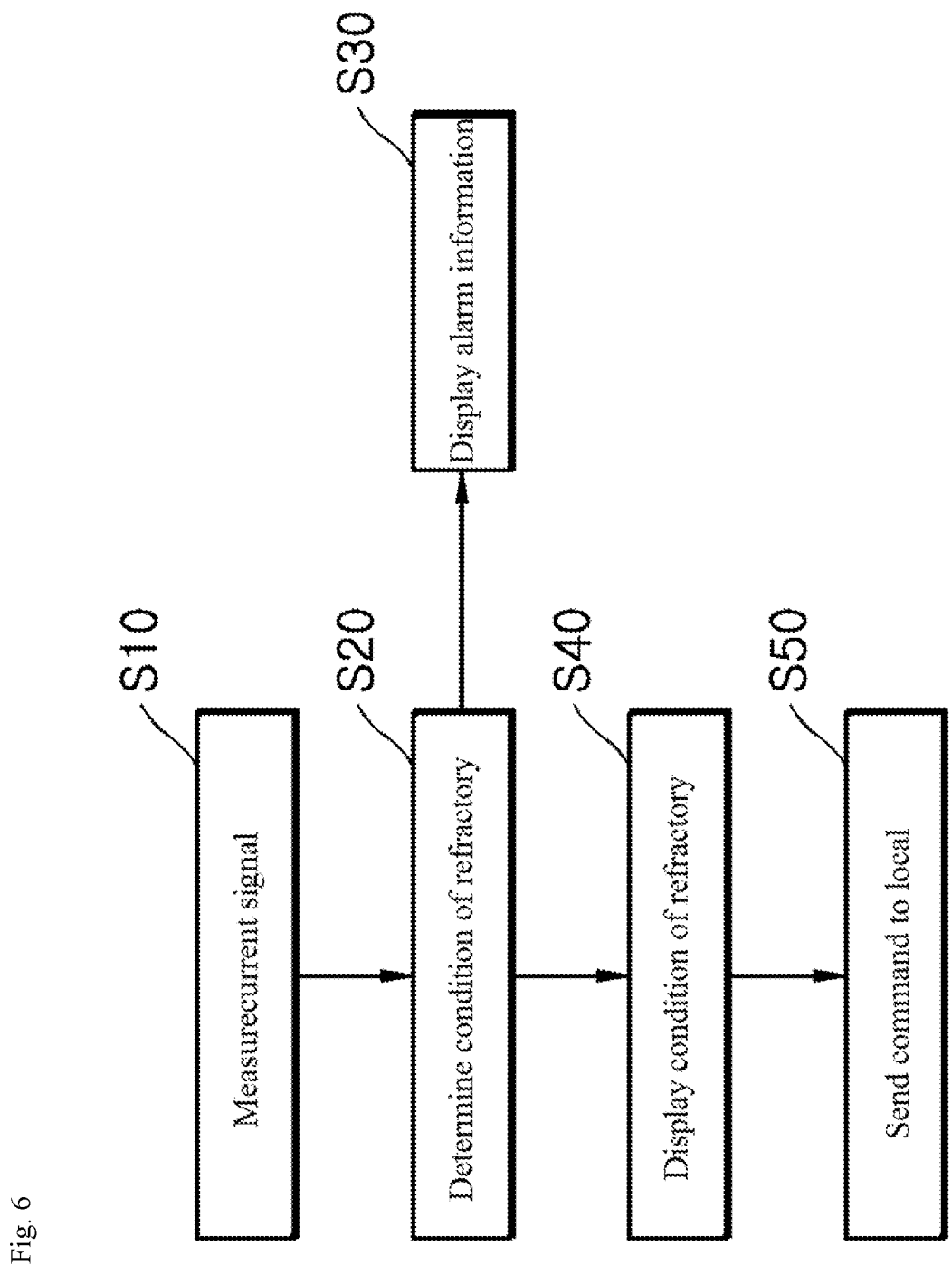
FIG. 6 is a flowchart illustrating schematic stages of a method of controlling an integrated refractory management system according to the present invention.

As shown in FIG. 6, the method of controlling the integrated refractory management system according to the present invention includes measuring a current signal (S10), determining a condition of refractory (S20), displaying alarm information (S30), displaying the condition of the refractory (S40), and sending a command to a local terminal (S50).

In measuring the current signal (S10), a current signal flowing through the cable module 100 is measured by the measurement module 20.

In determining the condition of the refractory (S20), a degree and a location of damage to the refractory 50 are determined by analyzing the current signal measured by the measurement module 20.

In displaying the alarm information (S30), when the condition of the refractory 50 is outside a normal condition, the alarm unit disposed near the refractory 50 displays the alarm information.

In displaying the condition of the refractory (S40), the integrated management module 30 displays the condition of the refractory 50 on the data output unit 35.

In transferring the command to the local terminal (S50), the integrated management module 30 sends the management information on the refractory 50 to the local terminal 40.

Figure 7:
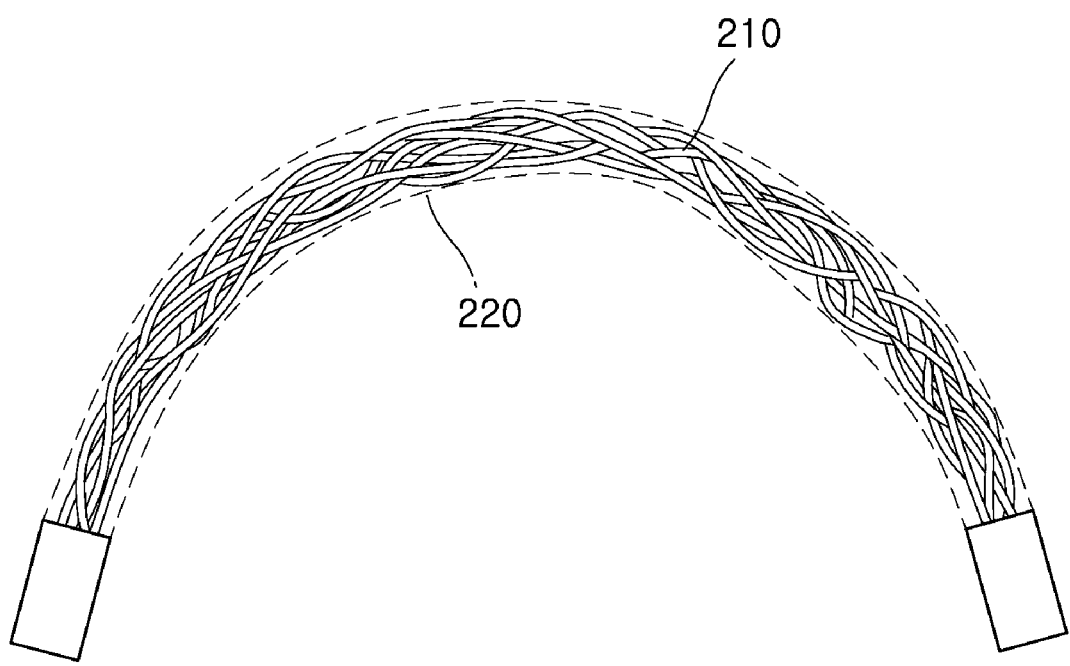
FIG. 7 is a side view of a second embodiment of a cable module according to the present invention.

Next, a second embodiment of a cable included in the integrated refractory management system according to the present invention will be described with reference to FIG. 7.

Since a structure for coupling each of the refractory 50 and the measurement module 20 to the cable included in the integrated refractory management system according to this embodiment is substantially the same as in the first embodiment set forth above, descriptions thereof will be omitted.

However, unlike in the first embodiment set forth above, the cable included in the integrated refractory management system according to this embodiment includes a metal wire obtained by twisting together a plurality of individual wires 210, and a space securing coating layer 220 coated onto at least a portion of an outer surface of the metal wire.

Therefore, the metal wire has an increased surface area contacting the refractory and allows the refractory to be caught between the twisted shapes, whereby the coupling structure between the refractory 50 and the cable module 100 can be reinforced.

Although the present invention has been described with reference to some embodiments, it should be understood that the present invention is not limited to the foregoing embodiments, and that various modifications and changes can be made by those of ordinary skill in the art without departing from the spirit and scope of the invention.

INDUSTRIAL APPLICABILITY

The integrated refractory management system and the method of controlling the same according to the present invention can determine a condition of refractory damaged due to heat or impact and can efficiently manage the refractory through easy determination on a damage location and damage information of the refractory. Thus, the present invention can be broadly applied to various industrial furnaces, such as heating furnaces, heat treatment furnaces, calcining furnaces, and blast furnaces, which are used for iron manufacturing processes and the like.

The invention claimed is:

1. An integrated refractory management system comprising:
   a cable module at least partially inserted into a refractory;
   a measurement module disposed outside the refractory and measuring a current signal flowing through the cable module;
   an integrated management module determining a condition of the refractory based on the current signal measured by the measurement module, displaying the condition of the refractory, and generating management information on the refractory; and
   a local terminal receiving the management information from the integrated management module,
   wherein the cable module comprises one or more cables disposed inside the refractory, and each of the cables comprises: a metal wire having both ends coupled to the measurement module; and a space securing coating layer coated onto at least a portion of an outer surface of the metal wire in order to secure an expansion space for the metal wire by being melted,
   wherein the metal wire comprises a wire main body having a screw shape and a protrusion having a saw tooth shape and protruding from at least a portion of an outer surface of the wire main body,
   wherein the measurement module comprises: a sensor for measuring the current signal flowing through the cable module; and a data transmitter for transmitting the current signal measured by the sensor to the integrated management module,
   wherein the integrated management module comprises: a data reception unit for receiving the current signal sent from the data transmitter; a data analysis unit configured for analyzing the condition of the refractory by calculating the current signal sent from the data reception unit a data output unit for displaying the condition of the refractory determined by the data analysis unit to monitor the condition of the refractory; and a management instruction unit configured for transmitting management information on the refractory to the local terminal,
   wherein the integrated management module further comprises a data storage for storing information related to the condition of the refractory,
   wherein the data analysis unit is further configured to determine management information of the refractory based on number and history of the refractory stored in the data storage,
   wherein the data output unit is further configured to display the available stock and history of the refractory, and damage and breakage histories of the refractory.

2. The integrated refractory management system according to claim 1, wherein the cable module comprises a first cable and a second cable disposed independently of each other according to depth in the refractory, and each of the first cable and the second cable is independently connected to the measurement module and forms a closed loop.

3. The integrated refractory management system according to claim 1, wherein the space securing coating layer comprises paraffin and the metal wire is obtained by twisting a plurality of individual wires into twisted shapes.

4. The integrated refractory management system according to claim 1, wherein the metal wire further comprises a refractory bonding member irregularly bonded to at least a portion of an outer surface of the wire main body.

5. A method of controlling the integrated refractory management system according to claim 1, the method comprising:
   measuring, by the measurement module, a current signal flowing through the cable module;
   determining, by the integrated management module, a condition of a refractory according to the current signal measured by the measurement module;
   displaying, by the integrated management module, the condition of the refractory on the data output unit; and
   transmitting, by the integrated management module, management information on the refractory to the local terminal.

6. The method according to claim 5, further comprising:
   displaying, by an alarm unit, alarm information when the condition of the refractory is outside a normal condition, the alarm unit being disposed near the refractory.

* * * * *